United States Patent [19]

McLean

[11] 4,378,865
[45] Apr. 5, 1983

[54] RUBBER AND VISCOUS/RUBBER TORSIONAL DAMPERS AND METHOD OF MAKING THE SAME

[75] Inventor: Ronald L. McLean, Tonawanda, N.Y.

[73] Assignee: Houdaille Industries, Inc., Fort Lauderdale, Fla.

[21] Appl. No.: 215,111

[22] Filed: Dec. 10, 1980

[51] Int. Cl.³ .............................................. F16F 7/10
[52] U.S. Cl. .................................... 188/379; 29/451; 74/574
[58] Field of Search ....................... 188/379, 386, 378; 74/574; 29/451

[56] References Cited

U.S. PATENT DOCUMENTS

| | | | |
|---|---|---|---|
| 2,473,335 | 6/1949 | Hardy | 74/574 |
| 3,196,710 | 7/1963 | Peirce | 74/574 |
| 3,236,528 | 2/1966 | Bram | 29/451 |
| 3,242,766 | 3/1966 | Arnt | 74/574 |
| 3,992,963 | 11/1976 | Khanna | 74/574 |
| 4,046,230 | 9/1977 | Troyer | 74/574 |
| 4,254,847 | 3/1981 | Kamman et al. | 188/379 |

FOREIGN PATENT DOCUMENTS 1132387  6/1962  Fed. Rep. of Germany ........ 74/574

Primary Examiner—George E. A. Halvosa
Attorney, Agent, or Firm—Hill, Van Santen, Steadman, Chiara & Simpson

[57] ABSTRACT

A rubber or rubber/viscous torsional damper assembly of the type having an annular inertia mass mounted for relative torsional damping movement on an annular body portion of a rotor disk has elastic rings fixedly secured to the rotor body portion and pressing against a substantial radial width of axially inwardly facing surface area within a chamber in the inertia mass under preload compression. Annular ribs on the rings fits in annular grooves at the radially inner sides of the surface areas and substantially restrain the elastic rings against radially inward extrusion flow displacement, so that the preload compression is maintained radially outwardly relative to the ribs. Additional grooves adjacent to the radially outer sides of the surface areas receive complementary ribs on the rubber rings for controlling against radially outward rubber displacement in the viscous/rubber damper assemblies.

19 Claims, 9 Drawing Figures

RUBBER AND VISCOUS/RUBBER TORSIONAL DAMPERS AND METHOD OF MAKING THE SAME

This invention relates generally to improvements in torsional dampers of the kind adapted for attenuating torsional vibrations in the crankshafts of internal combustion engines.

In one popular form, such dampers comprise a rotor disk having a hub portion arranged to be secured to the end of a crankshaft and a radially extending annular body flange portion on which is corotatively mounted an inertia mass yieldably coupled to the hub body flange in a manner to effect attenuation of torsional crankshaft vibrations due to the inertial resistance of the inertia mass. In some of these dampers the coupling is primarily or entirely elastomeric, i.e., rubber whether natural, or artificial, or a combination thereof. Other of these dampers may comprise a combinaton of rubber and viscous coupling means, wherein rubber tuning ring means maintain a shear film spacing between parallel surfaces of the inertia mass and body flange in which viscous damping medium such a silicone fluid is filled.

In either form of the mentioned dampers, there exist the problems of applying the rubber ring means, maintaining proper compression or loading, and preventing or at least minimizing relative movement between the rubber ring means and the inertia mass. In addition in the viscous/rubber dampers there are problems in attaining true concentricity when assembling the damper parts, and also in maintaining a leakproof seal against escape of damping fluid from within the working chambers of the dampers.

By way of example, U.S. Pat. No. 2,473,335 is referred to as disclosing a torsional rubber damper in which the rubber coupling between a disk flange and an annular inertia ring carried by the flange comprises rubber rings compressed between the metal members of the damper, and the rubber rings make only frictional contact with the metal members. U.S. Pat. No. 3,196,710 discloses a rubber torsional damper in which the rubber coupling means comprise rubber molded, i.e. vulcanized, onto the mounting flange of the rotor disk, and the rubber is in merely frictional engagement with the inertia mass.

In both of U.S. Pat. Nos. 2,473,335 and 3,196,710, the radially inner sides of the chambers within the inertia masses in which the rubber elements are contained are open and the radially inner diameters of the rubber elements can flow along the unsecured surfaces of the inertia members and thus displace radially inwardly under compression and lose torsional vibration attenuating capacity or at least lose damper tuning value. That is, the dampers will tend to afford less than desirable torsional vibration attenuating value. While in U.S. Pat. No. 2,473,335 the obliquely turned annular shoulders at the radially inner edges of the stamped sheet metal inertia member clamping plates will serve as some restraint upon radially inward extrusion flow of the rubber under compression, this is only a partial solution because due to the oblique formation of the shoulders rubber flow and loss of compression are not precluded. It will be noted in U.S. Pat. No. 3,196,710 that no means are provided to prevent radially inward flow displacement of the rubber under compression along the rubber engaging surfaces of the inertia mass.

In U.S. Pat. No. 4,046,230, representative of rubber/viscous dampers of the kind having a ring shaped inertia mass carried by a radial body flange of a hub disk, rubber rings are disclosed as adhesively secured to one or both of the surfaces of the inertia mass and supporting flange of the disk rotor. In this patent, radially outwardly facing sealing shoulder wall surfaces are provided at the radially inner diameters of the grooves in the inertia members in which the rubber tuning, spacing and sealing rings are received. The sealing surfaces at the radially inner sides of the grooves are of very limited area in contact with the inner diameters of the rubber rings and of limited sealing efficiency and contribute very little to frictional retention of the inertia mass against slippage relative to the rubber rings.

An important object of the present invention is to overcome the problems, disadvantages, drawbacks, inefficiencies, and shortcomings inherent in prior dampers of the kind under consideration.

Another object of the invention is to provide a new and improved torsional damper affording efficient rubber ring means compression loading control including effective displacement flow control of the ring means within the inertia mass chamber, increased area of contact with the inertia mass and resistance against slippage in limited damper diameter, effective centering interlock of the coupling tuning rubber means with the inertia mass, and in a rubber/viscous damper improved sealing against leakage of viscous damping medium.

A further object of the invention is to provide a new and improved method of making such a damper.

The invention provides in a torsional damper assembly including a rotor disk having a radially outer annular body portion and an annular inertia mass having a radially inwardly opening annular chamber in which said annular body portion is received, and elastic ring means fixedly secured to said body portion and pressing against a substantial radial width of axially inwardly facing surface area within said chamber of the inertia mass under preload compression between said surface area and said body portion; the improvement comprising annular groove means at the radially inner side of said surface area, and annular rib means on said ring means fitting in said groove means and substantially restraining said ring means against radially inward extrusion flow displacement so that said preload compression is maintained radially outwardly relative to said rib means.

The invention also provides a method of making a torsional damper assembly including a rotor disk having a radially outer annular body portion and an annular inertia mass having a radially inwardly opening annular chamber in which said annular body portion is received, comprising providing said rotor disk and said inertia mass as separate parts wherein said inertia mass has a substantial radial width of surface area facing toward said annular body portion, providing annular groove means at the radial inner side of said surface area, securing to said body portion annular elastic ring means for engaging said surface area, assembling said annular body portion and said annular inertia mass by engaging annular rib means on said elastic ring means in said groove means and squeezing said ring means between said body portion and said inertia mass and thereby placing the ring means under preload compression, and by the engagement of said rib means in said groove means substantially restraining said ring means against radially inward flow displacement extrusion and thereby maintaining said preload compression radially outwardly relative to said rib means.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which.

Figure 1:
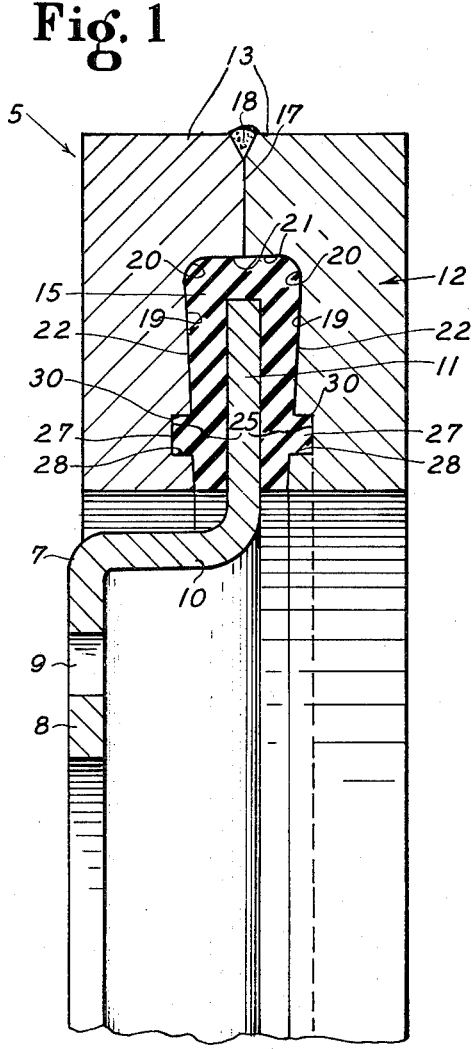
FIG. 1 is a fragmentary radial sectional detail view through a rubber torsional damper exemplifying the invention.

On reference to FIG. 1, a rubber torsional damper 5 comprises a rotor desirably in the form of a stamped heavy gauge sheet metal, e.g. steel, disk, having a central hub portion 8 provided with customary bolt holes 9 by which the rotor is adapted to be secured to a crankshaft, the torsional vibrations of which are to be damped. Axially offset relative to the hub portion 8 of the rotor 7, as by means of an annular axially extending offsetting bend 10, is a radially extending annular body section or flange 11 adapted to support an annular inertia mass 12. In a preferred form, the inertia mass 12 comprises a pair of preferably identical, complementary ring shaped cast steel inertia rings 13 of greater radial dimension than the rotor flange 11 and provided in their axially inner faces which are directed toward one another, with complementary cavities 14 (FIG. 2) providing in the assembly a chamber within which is engaged a rubber coupling and tuning ring 15 mounted on the rotor flange 11. Radially outwardly from the chamber cavities 14, the inertia mass ring members 13 have axially facing engagement surfaces 17 which in the assembly abut one another and limit compression of the rubber ring 15 between the inertia members to a desired tuning value having regard to the various parameters involved in the damper. Means for securing the inertia members 13 in assembly may comprise any desired means such as, but not limited to welding 18 shown in FIG. 1 as comprising a flux core wire process weld, but may be an electron beam weld if preferred.

It will be understood that the rubber ring 15 may comprise any suitable elastomer of the proper elasticity and durometer suitable for the purpose. For example for a diesel engine crankshaft rubber damper of about 11 to 12 inches diameter, the rubber ring means 15 may comprise an ethylene acrylic elastomer having a rating of 60-65 on the Shore A hardness scale. Any preferred molding and vulcanizing technique may be employed to shape and fixedly secure the rubber ring 15 in encasing relation to the rotor flange 11. As molded in place on the rotor flange 11, the coupling ring 15 is dimensioned slightly oversized in those areas which are placed under compression in assembly with the inertia mass 12, so that in the completed damper the rubber ring will completely fill the chamber provided by the cavities 14 under the desired compression having regard to the torsion attenuating tuning desired for the elastic coupling rubber ring.

In a preferred construction, each of the cavities 14 is defined by a generally axially facing and radially extending rubber ring engaging and compressing surface 19 and which tapers radially and axially outwardly to a radius fillet 20 at juncture with a radially inwardly facing axially extending surface 21 defining the radially outer boundary of the housing and elastic coupling ring accommodating chamber formed by the combined complementary cavities 14. Complementary to the cavity surface areas 19, the molded rubber ring member 15 has oppositely generally axially facing and radially extending engagement surfaces 22 which taper complementary to the taper of the inertia member surfaces 19. In the unconfined and uncompressed condition of the elastic ring member 15, the engagement surfaces 22 join at their radially outer edges oblique radially outwardly convergent shoulder surfaces 23 which at their radially outer ends join an annular axially extending radially outwardly facing crown surface 24. Further, the uncompressed condition of the elastic ring member 15, the engagement surfaces 22 are spaced apart slightly greater than the ultimate assembled space between the inertia member cavity surfaces 19, to an extent calculated to attain complete filling of the chamber within the inertia member 12 in the final assembly wherein the surfaces 19 press against the elastomer ring surfaces 22 and effect displacement of the rubber in the sides of the elastic ring radially outwardly to cause the shoulders 23 to expand and fill into engagement with the fillets 20, as best on comparison of FIG. 1 with FIG. 2. The elastic rubber ring member 15 is thus placed under substantial preload compression. Due to the tapered cavity shape, which progressively widens radially outwardly and thus accommodates a thicker and greater volume of the rubber of the ring member 15, a uniform state of shear is attained throughout the radial dimension of the ring member 15. A petroleum-base rubber lubricant may be employed at the interface between the inertia mass surfaces 19 and the rubber surfaces 22 during the assembly operation to facilitate radially outward flow of the rubber into the voids between the rubber shoulders 23 and the fillets 20. Such lubricant will be absorbed by the rubber, leaving a dry joint shortly after assembly.

To restrain radially inward flow or extrusion of the rubber of the member 15 along the inertia member surfaces 19 (such flow along the engaged surfaces of the rotor flange 11 being precluded by reason of the vulcanized bonding of the rubber to such flange) the inertia mass surface area 19 in each instance is provided with an annular interlock groove 25 which is substantially narrower than the associated engagement surface area 19 and is located adjacent to but spaced from the inner diameter of the associated inertia mass ring 13. Each side of the body of the rubber ring 15 provides an axially extending integral annular rib 27 dimensioned preferably complementary in shape, and to fit into the corresponding groove 25. Desirably the complementary dimensions of the grooves 25 and ribs 27 are such that in effecting axial assembly of the parts, the ribs 27 will be received closely but in freely slidable relation within the grooves 25 to substantially the full depth of the grooves and then when the surfaces 22 of the rubber ring 15 are placed under compressive pressure by the inertia mass surfaces 19, the ribs 27 will, due to the compression tightly engage all surfaces within the grooves 25. By having the radially inner sides of the grooves 25 formed with axially extending and radially outwardly facing respective abrupt shoulders 8 and the ribs 27 formed with complementary radially inwardly facing shoulders 29, effective stopping resistance to radially inward preload flow of the rubber of the elastic member 15 is attained by the rib and groove interlock relationship. Radially inward pressure against the ribs 27 from the major mass of the rubber body under preload compression and which might tend to turn the ribs 27 out of the grooves 25 is thoroughly restrained by having radially inwardly facing axially extending respective interlock shoulders 30 defining radially outer sides of the grooves 25 and matching radially outwardly facing axially extending respective shoulders 31 on the ribs 27. Therefore, since the ribs 27 are of substantial length corresponding to the substantial depth of the grooves 25, the axial shoulders defining the groove and the engaged shoulders on the ribs will cooperatively tenaciously resist escape of the ribs 27 from their interlocked relation within the grooves 25 even though the preload compression of the rubber member 15 filling the cavity chamber in the fully compressed assembled relation of the inertia mass 12 may be of substantial magnitude. Not only does the rib and groove inter-relationship provide excellent loading for compression control for the rubber member 15, but also increases the rubber/inertia mass interface surface area contact with the inertia mass, which beneficially increases resistance to slippage of the inertia mass relative to the rubber coupling in the limited damper diameter.

It may be observed that there is about 40 to 50 percent more shear area contact of the inertia mass with the coupling rubber member 15 than the shear area contact of the rotor flange 11 with the coupling rubber member 15. The average shear stress is, therefore, 40 to 50 percent less at the unbonded rubber/metal interface on the inertia mass 12 than on the rotor/rubber bonded interface. This will permit a long damper life without slipping between the rubber coupling and the inertia mass during operation at torsional critical speeds. Hence, at least as good performance can be expected from the damper 5 as from a precompressed full vulcanize bonded design where the rubber is vulcanize bonded to not only the rotor but also to the inertia mass. The present invention attains these improved results at a reduced cost because bonding of the rubber to the inertia mass presents substantial problems which are avoided by the improved strictly frictional coupling engagement between the inertia mass and the rubber tuning coupling as described.

Enhanced effectiveness of the groove stop shoulders 28 in cooperation with the complementary rib shoulders 29 is attained by having the groove shoulders 28 wider than the opposite radially inwardly facing abrupt groove shoulders 30 so that the shoulders 28 in effect provide lips which protrude axially beyond the shoulders 30 in intercepting, stopping relation to compression loading forces in the body of the tuning, coupling rubber member 15 which might tend to cause radially inward displacement flow of the rubber along the associated cavity compression or clamping wall surface area 19 toward the radially inward opening from the inertia mass housing chamber where the radially inner edges of the rubber member 15 are unsupported.

Figure 3:
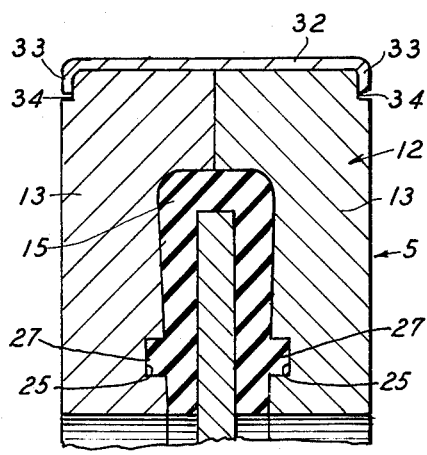
FIG. 3 is a fragmentary vertical sectional detail view similar to FIG. 1, but showing a modified means for securing the inertia members together.

Instead of a welded joint securement as at 18 in FIG. 1, other securing means for the damper 5 may comprise, as shown in FIG. 3 a peripheral securing ring 32 attached about the outer perimeter of the inertia mass 12 and having radially inwardly extending annular retaining flanges 33 along each side, clamping the inertia members 13 together and maintaining compression on the elastic ring means 15. In this instance, the upper axially outer shoulders of the inertia ring members 13 are provided with recessed rabbet grooves 34 within which the flanges 33 are received in a preferably substantially flush relation to the axially outer faces of the ring members 13.

Figure 4:
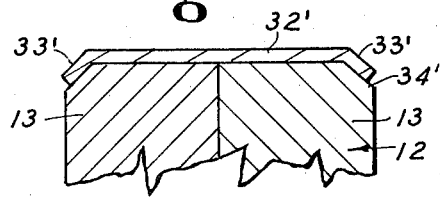
FIGS. 4 and 5 show modifications in the means for holding the inertia members together in assembly, and FIGS. 6 to 9, inclusive, are fragmentary radial sectional detail views showing the invention embodied in respective rubber/viscous torsional dampers.
Figure 5:
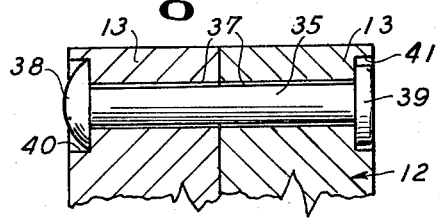

To similar effect, as shown in FIG. 4, a securing ring 32' has generally radially inwardly turned side retaining flanges 33' which are engaged against chamfered shoulders 34'. This arrangement may be preferred where the flange rolling equipment is better suited to roll the retaining flanges against the chamfered shoulders.

If preferred, the inertia ring members 13 may be secured together by means of rivets 35 of suitable number circumferentially spaced and extending through aligned rivet holes 37 in the members 13 adjacent their perimeters. Rivet heads 38 and 39 at opposite ends of the rivet 35 in each instance may be received in respective suitable recesses 40 and 41.

Figure 6:
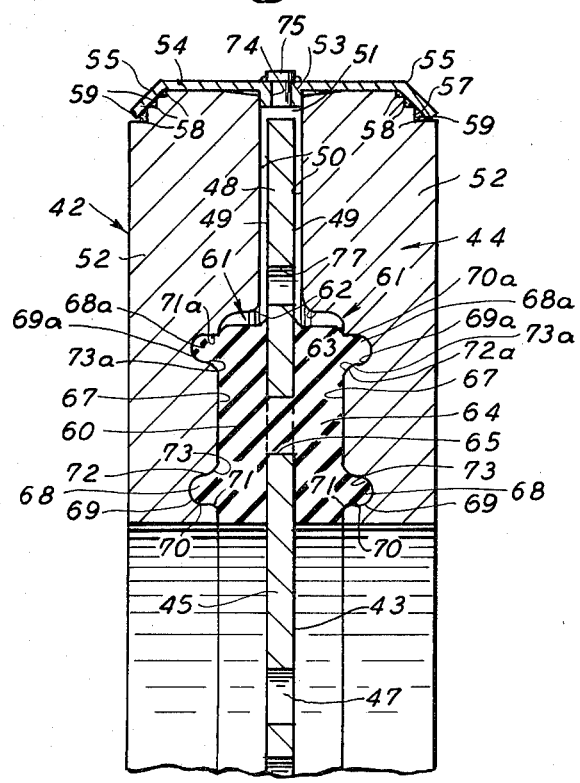

Principles of the present invention are adaptable to a tuned rubber viscous torsional vibration damper 42 as shown in FIG. 6. This damper comprises a metal plate, or heavy sheet metal stamped supporting rotor disk member 43 operatively supporting an annular inertia mass 44. In its radially inner portion the rotor disk comprises a hub flange 45 provided with attachment bolt holes 47 facilitating securing the damper in torsional vibration damping position on an internal combustion engine crankshaft. Integrally connected to the hub flange 45 is a radially outwardly extending circular body flange portion 48 which is adapted to provide axially oppositely facing working surfaces 49 cooperating in shear film spaced relation with respective confronting axial working surfaces 50 on the inertia mass 44 facing the surfaces 49. The shear film spaces between the working surfaces provide a working chamber 51 which is filled with a suitable viscous damping medium such as silicone, as is well known, and which provides a torsional vibration attenuating viscous coupling between the rotor flange 48 and the inertia mass 44. In a desirable construction, the inertia mass 44 comprises respective complementary inertia ring members 52 which are desirably maintained in proper spaced relation to provide the working chamber 51 by means of a spacer rib 53 extending radially from the axially inner face of a peripheral retaining ring 54. The radially outer margins of the inertia ring faces 50 are maintained in abutment with the rib 53 by means of generally radially inwardly turned flanges 55 on the ring 54. Conveniently, the flanges 55 are spun against chamfered shoulders 57 provided with annular stepped grooves 58 filled with sealant 59 against leakage of viscous damping medium for the chamber 51.

At its radially inner perimeter, the working chamber 51 is sealed by combination elastic, i.e. rubber, tuning, centering, concentricity maintaining, spacing and sealing ring means 60 mounted on the rotor body 48. To provide adequate mass in the elastic ring means 60 for tuning purposes, it is of substantial radial ring extent and axial thickness on each side of the body 48, and of suitable durometer for the intended tuning function. To accommodate the ring means 60, each of the inertia ring members 52 is provided with a suitable cavity or recess 61 radially inwardly from the radially inner end of the respective working surface 50. Each of the recesses 61 is of the same depth and width as the other and as nearly as practicable perfectly concentric. At their radially outer limits, the recesses 61 are defined by radially inwardly facing respective wall surfaces 62 which define with the radially outer perimeters of the elastic ring means 60 viscous damping medium reservoir spaces 63 communicating with the chamber 51. At their radially inner sides, the recesses 61 may be open, as shown.

By preference, the rubber ring means 60 is molded in place and vulcanize bonded to the rotor flange 48. For increased security of retention and to alleviate hysteresis stresses, the ring means 60 at each side of the rotor body 48 is desirably integrally connected by common tying lugs 64 of the rubber material extending through a plurality of circumferentially spaced keying holes 65 through the rotor body 48. As molded, the rubber ring means 60 is thicker than the ultimate space to be occupied by the ring means in the recesses 61 so that when placed under clamping compression against respective axially inwardly facing surface areas 67 defining the recesses 61, the ring means 60 will be compressively loaded to afford the desired rubber tuning spring effect, as well as to assist in maintaining a proper shear film spaced relation between the flange body 48 and the inertia mass 44 and to effect a thorough leakproof seal against loss of damping medium liquid from the working chamber 51.

For compression loading control, increased area of contact with the inertia mass for resistance to slippage, as well as to provide a concentricity maintaining interlock between the rubber ring means 60 and the inertia members 52, integral axially outwardly projecting radially inner and radially outer annular ribs 68 and 68a respectively on each of the axially outer sides of the ring means 60 are, in the assembly, engaged in annular complementary radially inner and outer grooves 69 and 69a, respectively, in the surface areas 67. Radially inwardly facing shoulder surfaces 70 on the ribs 68 engage against substantially abrupt radially outwardly facing annular shoulder surfaces 71 defining the grooves 69. Radially outwardly facing shoulder surfaces 70a on the ribs 68a engage against radially inwardly facing substantially abrupt annular shoulder surfaces 71a defining the grooves 69a. Radially outwardly facing annular surfaces 72 on the ribs 68 engage radially inwardly facing annular surfaces 73 defining the grooves 69. Radially inwardly facing annular surfaces 72a on the ribs 68a engage radially outwardly facing annular surfaces 73a defining the grooves 69a. The molded dimensions of the ribs 68 and 68a match the corresponding dimensions within the grooves 69 and 69a, respectively, so that during assembly operation of the damper parts, the ribs 68 and 68a will fit freely into the complementary grooves 69 and 69a, respectively.

Figure 2:
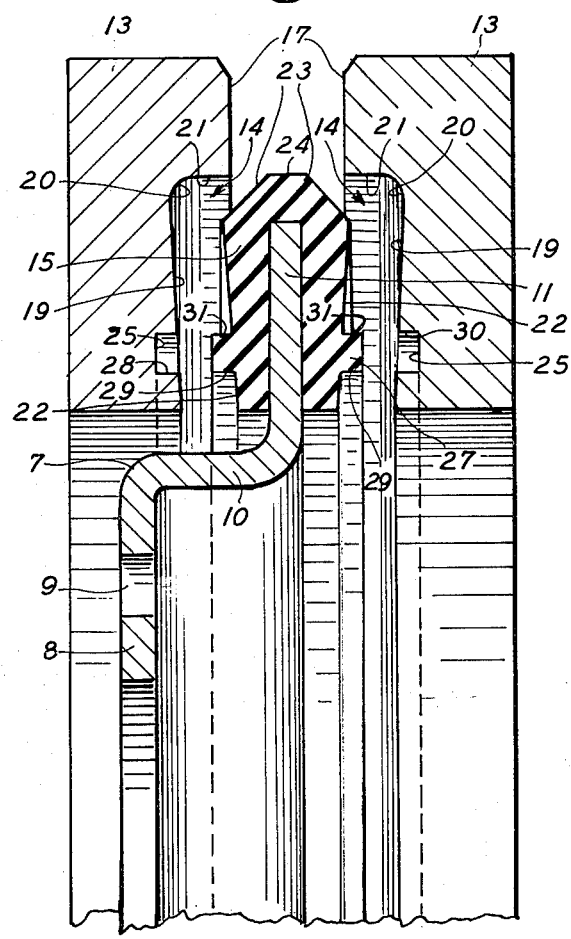
FIG. 2 is a fragmentary sectional detail view similar to FIG. 1, but showing the parts of the damper separated but aligned for assembly.

Assembly of the inertia mass ring members 52 may be effected similarly as described in connection with FIG. 2, by moving them coaxially toward one another, engaging the rubber ring ribs 68 in the grooves 69 and the ribs 68a in the grooves 69a, and assisted by the retainer ring 54, assuring concentricity of the parts during assembly. As the inertia members 52 are brought clamping together, the rubber ring means 60 is placed under compression loading, and the ribs 68 and 68a function in the grooves 69 and 69a to substantially the same effect and provide substantially the same advantages as described in detail in respect to the ribs 27 and grooves 25 in FIGS. 1 and 2, i.e. interlock of the ribs 68 in the grooves 69 restrains radially inward flow displacement of the rubber and interlock of the ribs 68a in the grooves 69a restrains radially outward displacement flow of the rubber under compression and also under centrifugal force during use of the damper. By having the groove shoulders 73 and 73a joining the roots of the grooves 69 and 69a, respectively, and the wall surfaces 67 on substantially ogee or radius curvature, advantageous compression loading vectors toward the areas of the elastomer ring means between the ribs 68 and 68a are attained. In addition to their other functions and attributes, the ribs 68 and 68a serve as sealing surfaces suplemental to the sealing engagement between the rubber ring means and the surface areas 67 in the assembly, even though no bonding medium is used between the rubber ring means and the surface areas 67 but frictional engagement alone is relied upon.

For filling the working chamber 51 with damping medium fluid, one or more filler openings 74 may be provided radially through the spacer rib 53. Plug means 75 hermetically seal the filler openings 74. To assure balanced filling of the working chamber 51, one or more cross flow port openings 77 may be provided in the rotor body 48 in general alignment with the reservoir spaces 63.

Figure 7:
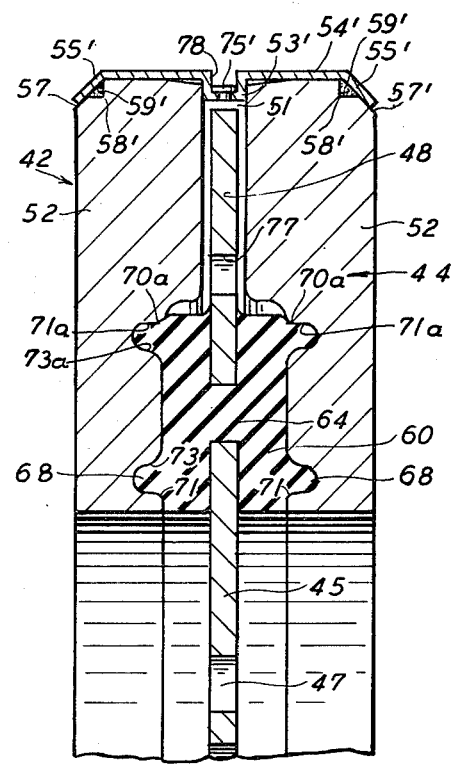

As shown in FIG. 7, the damper 42 is substantially the same as in FIG. 6, and like reference characters designate like parts and the same description applies. However, a modified retaining band or hoop ring 54' is shown. Whereas, the ring 54 of FIG. 6 has the spacer means 53 in the form of a solid rib, the ring 54' of FIG. 7 has the rib 53' formed as a radially inwardly indented pressed hollow rib defining a radially outwardly opening annular channel 78 in the bottom of which one or more filler openings 74' enable filling the working chamber 51 with viscous damping fluid medium, hermetically sealed by plug means 75' after filling is completed. Instead of a plurality of stepped sealing grooves between the retaining flanges 55' of the ring 54' and the chamfered shoulders 57', a single groove 58' filled with sealant 59' may be provided. Similarly, as in respect to the retaining flanges 55 in FIG. 6, the flanges 55' are adapted to be rolled into the retaining clamping engagement with the shoulders 57' of the inertia ring members 52.

Figure 8:
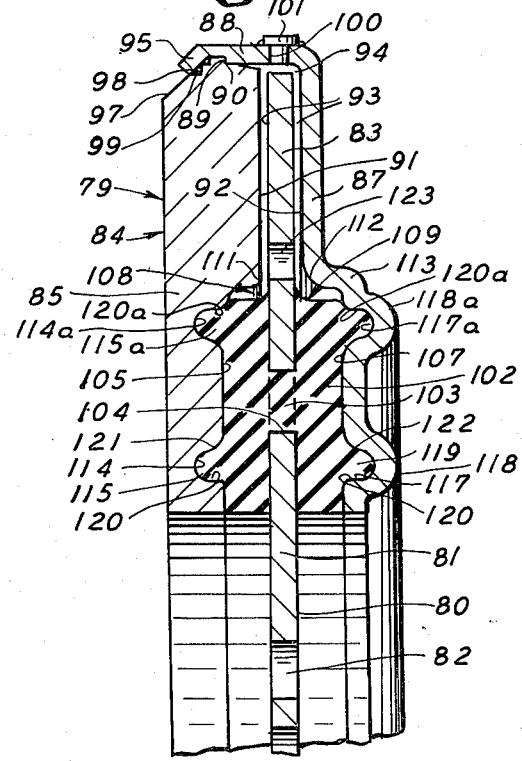

In FIG. 8 a modified viscous/rubber torsional damper 79 is depicted comprising a rotor disk 80 having a hub portion 81 with bolt holes 82 and integral with the hub 81 an annular body portion 83 carrying an inertia mass assembly 84 including a cast inertia ring 85 and a stamped heavy gauge sheet metal inertia ring member 87. Concentric assembly of the inertia members 85 and 87 is maintained by means of an axially extending radially facing integral flange 88 at the outer perimeter of the stamped ring 87 which is engaged in fixed relation about the outer perimeter of the inertia member 85 and has a stepped axially facing gauging shoulder 89 abutting an oppositely axially facing gauging shoulder 90 on the member 85 for maintaining a substantially accurate spacing between a radially extending axially facing annular working surface 91 on the member 85 and a similar oppositely axially facing annular working surface 92 on the member 87 so as to provide for a shear film spaced relation with confronting oppositely facing working surfaces 93 on the rotor disk body 83, having regard to the viscosity of a viscous damping medium in a working chamber 94 enclosed within the housing provided by the assembled members 85 and 87. For substantially permanently securing the members 85 and 87 against separation, a clamping and retaining flange terminal 95 on the flange 88 is spun onto a chamfered shoulder 97 on the member 85 and effects a sealed joint by locking sealant 98 in an underlying annular groove 99. Filling of the working chamber 94 with viscous dampening medium is adapted to be effected through one or more filler openings 100 extending through the flange 88 in alignment with the chamber 94 and hermetically sealed after filling by plug means 101.

Combination elastic tuning, spacer, concentricity maintaining and sealing ring means 102 carried by the rotor disk body 83 radially inwardly relative to the working chamber 94 cooperate with the inertia ring means 84 not only to provide an elastic tuning coupling between the rotor disk and the inertia mass but also to maintain the rotor disk and the inertia mass ring means concentric as well as to maintain the shear film spaced relation between the working surfaces 91 and 92 with respect to the working surfaces 93, and to maintain a thoroughly leakproof seal at the radially inner side of the working chamber 94 which opens radially inwardly from the inertia ring mass.

Similarly, as described with respect to the elastic ring means 60 in FIG. 6, the elastic ring means 102 comprise in effect substantially equal elastic rings on each side of the disk body 83, vulcanize bonded to the disk body and desirably integrally connected by means of keying lugs 103 at circumferentially spaced intevals extending through keying holes 104 in the disk body. The elastic ring means 102 is dimensioned complementary to and to be received under preload compression by and between respective axially inwardly facing and radially extending surfaces 105 and 107 on the members 85 and 87 and located within respective cavities or recesses 108 and 109 in such members. At their radially outer sides the recesses 108 and 109 provide annular reservoir spaces 110 between the radially outer perimeter of the elastic ring means 102 and respective generally radially inwardly facing surface area 111 on the inertia member 85 and surface area 112 on the inertia member 87. As will be observed, the surface area 112 is provided by an offsetting bend 113 of the member 87.

Adjacent to its radially inner diameter, the inertia member 85 is provided with an annular axially inwardly facing groove 114 in the wall surface 105 receptive of an integral annular complementary rib 115 on the elastic ring means 102. Adjacent to the radially outer side of the wall surface 105 the inertia member 85 is provided with an annular axially inwardly facing groove 114a receptive of an integral annular complementary rib 115a on the elastic ring means 102. To similar effect, and axially aligned with the grooves 114 and 114a, annular axially inwardly opening grooves 117 and 117a, respectively, are provided in the wall surface 107 of the inertia member 87 conveniently in the bights of respective axially outwardly projecting annular bulges 118 and 118a, respectively, formed in the inertia member 87. Complementary annular ribs 119 and 119a on the elastic ring means 102 engage in the grooves 117 and 117a, respectively. Similarly, as described in connection with the ribs 68, 68a and the grooves 69,69a in FIG. 6, the elastic means ribs 115, 115a and 119, 119a control preload compression flow displacement of the rubber of the elastic means 102 to be radially toward the between-the-ribs areas of the rubber ring means in each of the recesses 108 and 109. For this purpose, abrupt shoulders 120 at the radially inner sides of the grooves 114 and 117 and shoulders 120a at the radially outer sides of the grooves 114a and 117a cooperate in substantially anchoring the ribs 115 and 119 against radially inward displacement and the ribs 115a and 119a against radially outward displacement. An ogee curved surface 121 at the radially outer side of the groove 114, and an ogee curved surface 122 at the radially outer side of the groove 117 contribute toward radially outward between-the-ribs preload displacement flow biasing of the material of the elastic ring means 102. Similar ogee, curved surface 121a of the radially inner side of the groove 114a, and 122a at the radially inner side of the groove 117a, contribute toward radially inward between-the-rib flow displacement or flow biasing of the material of the elastic ring means 102. One or more damping medium fluid balancing ports 123 through the rotor disk body 83 may be provided generally in alignment with the annular reservoir spaces 110.

Figure 9:
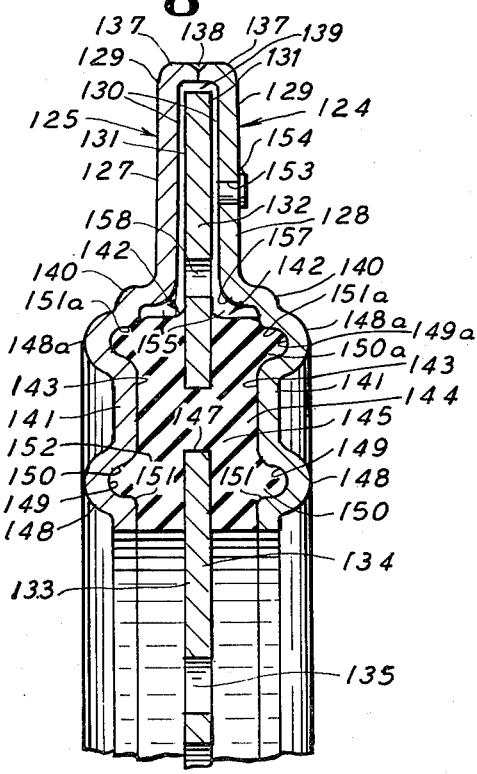

A viscous/rubber torsional damper 124 (FIG. 9) functionally similar to the dampers 42 and 79 comprises an annular inertia ring assembly 125 including a pair of substantially identical heavy gauge stamped sheet metal inertia ring members 127 and 128. Each of the members 127 and 128 has an annular radially outer portion 129 of substantial width providing an axially inwardly facing annular working surface adapted to cooperate in shear film spaced relation with respective opposed axially outwardly facing working surfaces 131 on a radially outer annular body portion 132 of a rotor disk 133 having a radially inner hub portion 134 provided with attachment bolts holes 135. A desired spaced relation between the inertia ring member portions 129 is maintained by radially outer perimeter axially inwardly directed spacer flanges 137 which abut one another and are permanently secured as by means of welding 138, providing a hermetically sealed joint preventing leakage of viscous damping medium from a working chamber 139 defined within the housing provided by the inertia assembly 125.

At the radially inner side of the working chamber 139, the members 127 and 128 have respective generally radially outwardly extending offsetting bends 140 from which extend, generally radially inwardly, annular portions 141 of substantial width on the members 127 and 128 defining respective annular cavities or recesses 142 having generally axially inwardly facing, radially extending respective wall surfaces 143 which maintain under preload compression elastic centering, spacer, concentricity maintaining, tuning and sealing ring means 144 desirably equally on both sides of the rotor body portion 132 and vulcanize bonded thereto with one or more keying lugs 145 extending integrally through keying holes 147. adjacent to their inner perimeters, the inertia members 127 and 128 are formed with respective axially outwardly projecting annular bulges 148 defining axially inwardly opening annular respective grooves 149 within which respective axially outwardly extending integral annular ribs 150 on the elastomer ring means 144 are received for controlling against radially inward preload flow displacement of the rubber of the elastic ring means 144 which, similarly as in the other forms of the damper described, has a wider overall axial dimension as vulvanize molded and is then placed under preload compression in the completed assembly. Adjacent to the radially outer sides of the annular recesses 142, the inertia members 127 and 128 are formed with respective axially outwardly projecting annular bulges 148a defining axially inwardly opening annular respective grooves 149a within which respective axially outwardly extending integral annular complementary ribs 150a on the elastomer ring means 144 are received for controlling against radially outward preload flow displacement of the rubber of the elastic ring means 144.

Abrupt generally radially outwardly facing shoulder means 151, at radially inner sides of the grooves 149 assist the ribs 150 in controlling radially outward flow displacement and tuning preload of the elastic ring means 144. Similarly, abrupt generally radially inwardly facing shoulder means 151a at the radially outer sides of the grooves 149a assist the ribs 150a in controlling radially inward flow displacement and tuning preload of the elastic ring means 144. Ogee curved surfaces 152 at the radially outer sides of the grooves 149 and ogee curved surfaces 152a at the radially inner sides of the grooves 149a also assist in the flow displacement control of the material of the elastic ring means 144 toward the between-the-rib areas of the ring means 144.

For filling the working chamber 139 with viscous damping fluid, one of the inertia members 127 or 128, herein the member 128, has one or more filler openings 153 hermetically sealed after filling by means of a plug 154. At the radially inner end of the working chamber 139 annular reservoir spaces 155 are provided between the radially outer sides of the elastic means 144 and curved respective surfaces 157 provided by the offsetting bends 140. One or more cross ports 158 through the disk body 132 in substantial alignment with the reservoir spaces 155 provide for substantially equalized damping fluid distribution within the working chamber 139 and add to the volume of the reservoir spaces.

It will be understood that variations and modifications may be effected without departing from the spirit and scope of the novel concepts of this invention.

I claim as my invention:

1. In a torsional damper assembly including a rotor disk having a radially outer annular body portion and an annular inertia mass having an annular chamber with a radially inwardly directed annular opening through which said annular body portion is received into said chamber, and elastic ring means of substantial width having substantially planar radially extending surfaces at least one of which is fixedly secured to said body portion and another such surface pressing against a substantial radial width of axially inwardly facing surface area within said chamber of the inertia mass under preload compression between said surface area and said body portion, the improvement comprising:
    and annular groove of minor width in the radially inner side portion of said surface area and close to said annular opening;
    an abrupt substantially right-angular radially outwardly facing annular shoulder at the radially inner side of said groove;
    an annular rib protruding from said another radially extending surface of said elastic ring means of minor radial extent relative to the radial extent of said ring means adjacent to the radially inner diameter of said elastic ring means and complementary to and fitting in said groove and having a substantially right-angular radially inwardly facing shoulder engaging said groove shoulder;
    said shoulders cooperating for restraining said elastic ring means against radially inward extrusion flow displacement toward said opening, so that said preload compression is maintained radially outwardly relative to said rib.

2. A damper according to claim 1, wherein at the radially outer side of said groove a radially inwardly facing abrupt shoulder cooperates with said radially outwardly facing shoulder for preventing turning of said rib out of the groove under radially inward pressure generated in said elastic ring means.

3. A damper according to claim 1, wherein surface slanting generally toward said surface area at the radially outer side of said groove facilitates radially outward elastic ring means flow bias under said preload compression.

4. A damper according to claim 1, wherein said surface area slopes from said groove divergently radially and axially outwardly relative to said body portion of said rotor disk.

5. A damper according to claim 4 wherein said shoulder at the radially inner side of said groove projects axially inwardly beyond the radially outer side of said groove.

6. A damper according to claim 1, wherein said elastic ring means encases said body portion of the rotor and fills said chamber under said preload compression, said surface area comprising surfaces of said inertia mass facing said body portion in spaced relation, said annular groove being duplicated at the radially inner side of each of said surfaces, and said ring means comprising oppositely extending annular ribs complementary to and respectively fitting in said grooves.

7. A damper according to claim 6, wherein said chamber is in part defined by fillet surfaces joining the radially outer edges of said surfaces, and said ring means having frustoconical shoulder portions deformed under the preload compression into positive conforming engagement with said fillet surfaces.

8. A damper according to claim 1, wherein said chamber extends to a substantial extent radially outwardly beyond said surface area and provides a viscous damping working chamber portion, said inertia mass being provided with axially inwardly facing working surfaces cooperating in shear film spaced relation with axially outwardly facing working surfaces on said rotor body portion, said elastic ring means providing leakproof seal at the radially inner side of said working chamber portion.

9. A damper according to claim 8, wherein said surface area is defined on axially inwardly facing cavities in said inertia mass at axially opposite sides of said rotor body portion, and the radially outer portions of said cavities providing reservoir spaces for said working chamber portion.

10. A damper according to claim 9, wherein said rotor body portion has viscous damping fluid equalizing port means substantially aligned with said reservoir spaces.

11. A damper according to claim 8, wherein said inertia mass comprises an annularly shaped relatively thick inertia member and a complementary annularly shaped heavy gauge sheet metal inertia member, said sheet metal inertia member having a radially outer edge axially extending annular connecting flange engaging about the radially outer perimeter of said thick inertia member, said flange closing the radially outer side of said chamber, and viscous damping medium filler port means in said flange communicating with said chamber.

12. A damper assembly according to claim 8, wherein said inertia mass comprises a pair of inertial members and one of said inertia members is a shaped heavy gauge sheet metal member having an axially extending flange on its radially outer perimeter, said flange engaging the other of said inertia members and closing the radially outer side of said chamber.

13. A damper according to claim 1, wherein said inertia mass comprises at least one heavy gauge stamped sheet metal member, said member having an annular axially outwardly projecting rib-like bulge defining said groove.

14. A damper according to claim 1, wherein said inertia mass has radially outwardly spaced from said annular groove, another annular groove in the radially outer portion of said surface area, said another annular groove having on its radially outer side an abrupt annular radially inwardly facing shoulder; and another annular rib on said elastic ring means one surface fitting in said another groove and having a radially outwardly facing shoulder complementary to said another annular groove shoulder, and said another groove shoulder and said another rib shoulder cooperating for restraining preload compression radially outward displacement of the between-the-rib area of said elastic ring means from the between-groove portion of said surface area.

15. A damper according to claim 14, wherein said inertia mass comprises a pair of members at least one of which is of stamped heavy gauge sheet metal, and said radially inner groove and said additional groove comprising axially inwardly opening annular grooves in axially outwardly projecting annular rib-like bulges in said stamped heavy gauge sheet metal member.

16. A method of making a torsional damper assembly including a rotor disk having a radially outer annular body portion and an annular inertia mass having a radially inwardly opening annular chamber in which said annular body portion is received, comprising:
providing said rotor disk and said inertia mass as separate parts wherein said inertia mass has a substantial radial width of surface area facing toward said annular body portion;
providing an annular concentric groove of minor width in the radially inner portion of said surface area close to the opening from said chamber;
forming an abrupt substantially right angular radially outwardly facing annular shoulder at the radially inner side of said groove;
securing to said body portion annular elastic ring means of substantially the same width as, and engaging said surface area and having substantially planar radially extending surfaces;
providing an annular rib of minor radial extent relative to the elastic ring means' radial extent on one of said elastic ring means' radially extending surfaces adjacent to its radially inner diameter and complementary to and adapted to fit in said groove and forming a substantially right angular radially inwardly facing shoulder on said rib complementary to said groove shoulder;
assembling said annular body portion and said annular inertia mass by engaging said elastic ring means against said surface area and receiving said annular rib in said annular groove and squeezing said elastic ring means between said body portion and said surface area and thereby placing said elastic ring means under preload compression;
and by the coaction of said rib shoulder and said groove shoulder restraining said elastic ring means against radially inward flow displacement extrusion and thereby maintaining said preload compression.

17. A method according to claim 16, comprising encasing said body portion of the rotor with said elastic ring means, and filling said chamber under said preload compression.

18. A method according to claim 17, comprising defining said chamber in part by an annular fillet surface joining said surface area, providing said ring means with a frusto-conical shoulder, and in said squeezing of said body deforming said elastic ring means into positive conforming engagement with said fillet surface.

19. A method according to claim 16, comprising providing a viscous damping working chamber portion of said chamber extending to substantial extent radially outwardly beyond said surface area and with axially inwardly facing working surfaces cooperating in shear film spaced relation with axially outwardly facing working surfaces on said rotor body portion, providing an additional annular groove in the radially outer portion of said surface area, and engaging an additional annular rib on said elastic ring means in said additional groove.

* * * * *